US 6,553,797 B2

(12) United States Patent
Witchey

(10) Patent No.: US 6,553,797 B2
(45) Date of Patent: *Apr. 29, 2003

(54) SKID STEER LOCK

(76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 0 days.

This patent is subject to a terminal disclaimer.

(21) Appl. No.: 10/062,432

(22) Filed: Feb. 5, 2002

(65) Prior Publication Data

US 2002/0104342 A1 Aug. 8, 2002

Related U.S. Application Data

(60) Provisional application No. 60/267,089, filed on Feb. 5, 2001, provisional application No. 60/266,680, filed on Feb. 5, 2001, provisional application No. 60/266,679, filed on Feb. 5, 2001, provisional application No. 60/266,636, filed on Feb. 5, 2001, provisional application No. 60/266,635, filed on Feb. 5, 2001, provisional application No. 60/266,634, filed on Feb. 5, 2001, and provisional application No. 60/266,633, filed on Feb. 5, 2001.

(51) Int. Cl.[7] .............................................. B60R 25/02
(52) U.S. Cl. ........................... 70/209; 70/226; 70/237; 70/200
(58) Field of Search .............................. 70/14, 18, 209, 70/163–172, 238, 57, 58, 225, 226, 237, 198–202

(56) References Cited

U.S. PATENT DOCUMENTS

| | | | | | |
|---|---|---|---|---|---|
| 2,596,802 | A | * | 5/1952 | Will | 70/230 |
| 4,103,524 | A | | 8/1978 | Mitchell et al. | 70/209 |
| 4,304,110 | A | * | 12/1981 | Fain | 70/209 |
| 4,970,884 | A | | 11/1990 | Solow | 70/209 |
| 5,022,697 | A | * | 6/1991 | Hettwer | 70/238 X |
| 5,082,213 | A | * | 1/1992 | Torres | 70/200 X |
| 5,121,617 | A | * | 6/1992 | Chen | 70/209 |
| 5,142,889 | A | * | 9/1992 | Liu | 70/209 |
| 5,144,822 | A | * | 9/1992 | Jan et al. | 70/209 |
| 5,212,973 | A | * | 5/1993 | van Staden et al. | 70/209 |
| 5,277,043 | A | * | 1/1994 | Inashvili | 70/238 |
| 5,419,165 | A | * | 5/1995 | Perkins | 70/14 |
| 5,439,210 | A | * | 8/1995 | Davis | 70/57 X |
| 5,440,907 | A | * | 8/1995 | Shen | 70/209 |
| 5,460,021 | A | * | 10/1995 | Taylor | 70/209 |
| 5,582,044 | A | * | 12/1996 | Bolich | 70/58 |
| 5,582,045 | A | | 12/1996 | Ahmed | 70/209 |
| 5,639,001 | A | * | 6/1997 | Brady | 70/226 X |
| 5,724,839 | A | * | 3/1998 | Thering | 70/18 |
| 5,865,044 | A | | 2/1999 | Wu | 70/209 |
| 5,908,178 | A | * | 6/1999 | Sandhagen | 70/58 X |
| 5,911,391 | A | * | 6/1999 | Russ et al. | 70/237 X |
| 5,927,109 | A | * | 7/1999 | Sieck | 70/58 |
| 5,953,941 | A | * | 9/1999 | Freund | 70/199 |
| 6,003,350 | A | * | 12/1999 | Sentner, Jr. | 70/202 |
| 6,173,590 | B1 | | 1/2000 | Witchey | 70/14 |
| 6,112,560 | A | * | 9/2000 | Mabee | 70/14 |
| 6,116,065 | A | * | 9/2000 | Hale | 70/200 |
| 6,311,530 | B1 | * | 1/2001 | Woodward | 70/164 X |

OTHER PUBLICATIONS

E Tip web page http://www.etipinc.com/skidlock.asp Dec. 6, 1999.

* cited by examiner

Primary Examiner—Suzanne Dino Barrett
(74) Attorney, Agent, or Firm—Richard C. Litman

(57) ABSTRACT

A skid steer lock for preventing the use of the drive control levers of a skid steer loader. The device consists of an extendable shaft which has an end plate at each end. Cage engaging means are welded to each plate. When in use the skid steer lock is positioned inside the cab of a skid steer loader above the driver's seat. The shaft is extended to force the cage engagement means through the safety cage present on the skid loader. Once the cage engagement are fully extended into the cage the extendable shaft is locked in position with a locking mechanism.

14 Claims, 8 Drawing Sheets

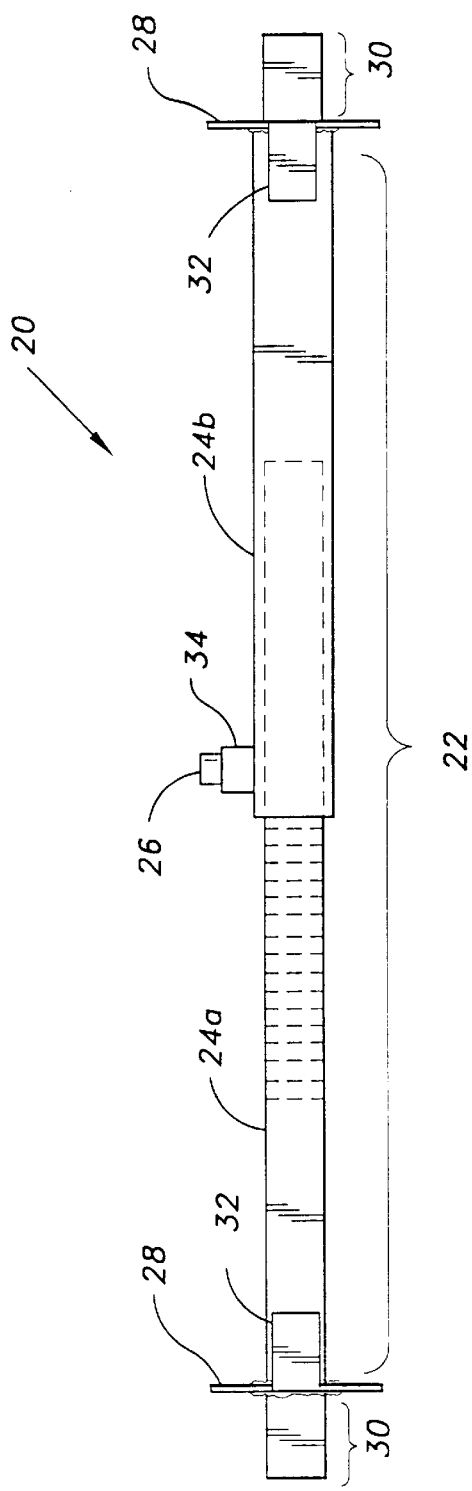
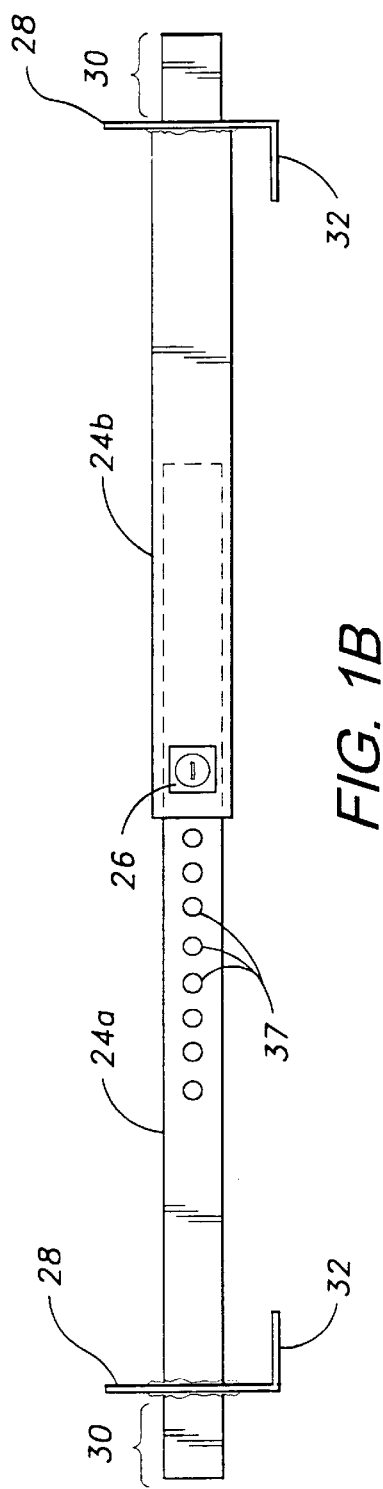
FIG. 1A
FIG. 1B

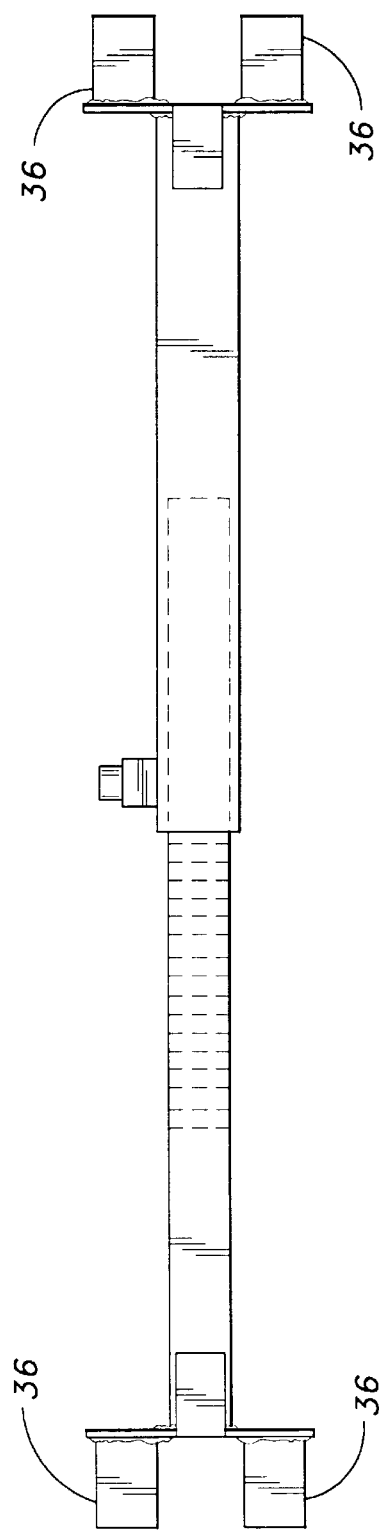
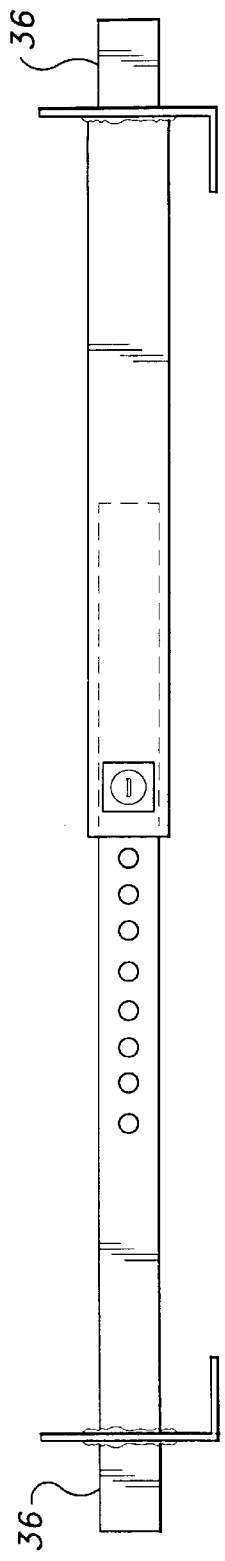
FIG. 3A
FIG. 3B

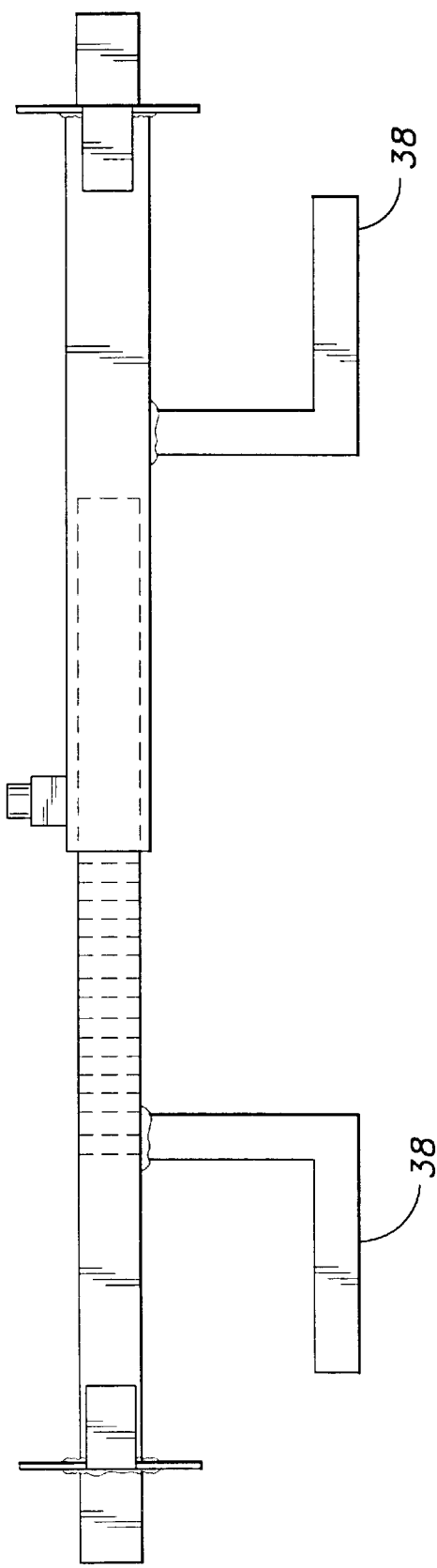
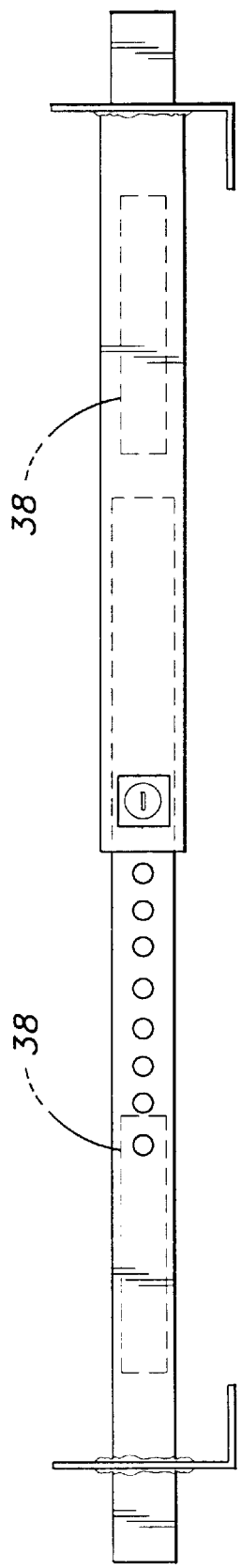
FIG. 4A
FIG. 4B

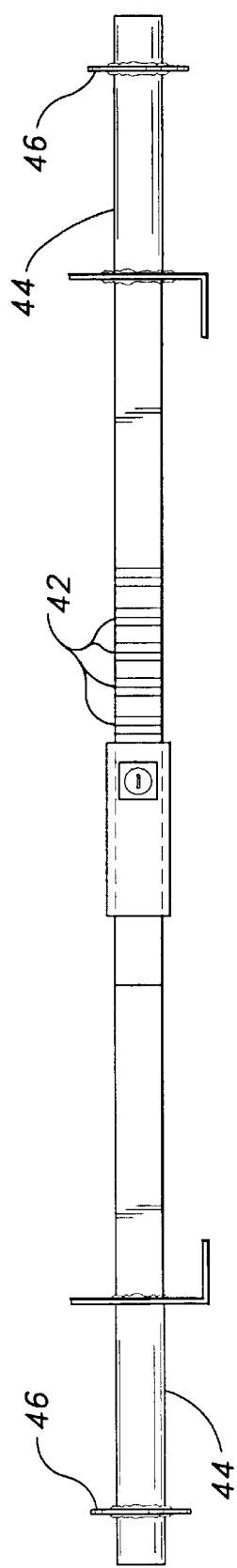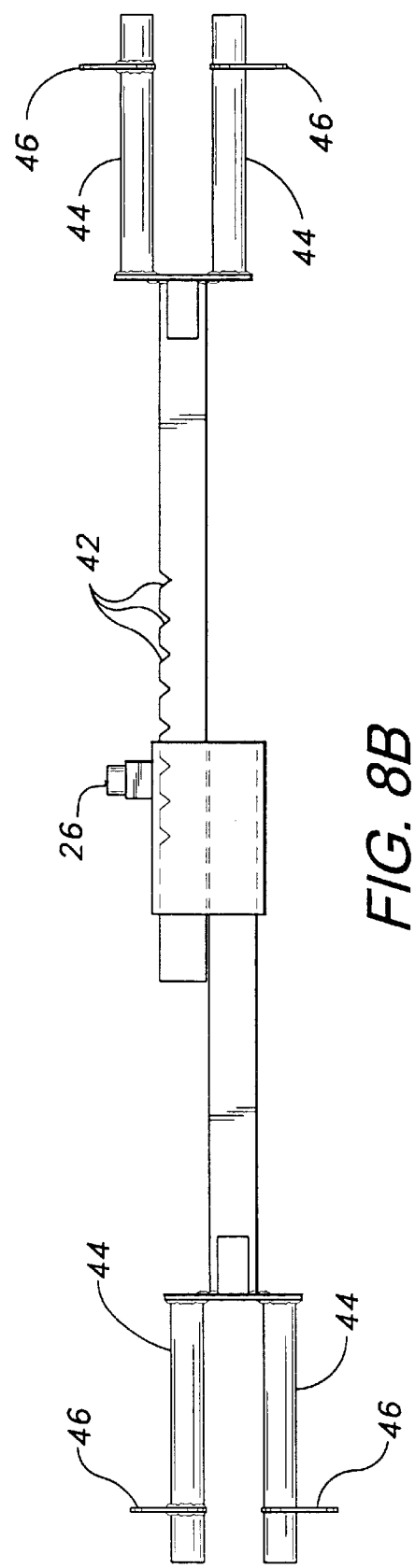
FIG. 8A
FIG. 8B

SKID STEER LOCK

CROSS-REFERENCE TO RELATED APPLICATION

This application claims the benefit of U.S. Provisional Patent Application Serial Nos. 60/267,089, 60/266,680, 60/266,679, 60/266,636, 60/266,635, 60/266,634, 60/266,633, all filed Feb. 5, 2001.

BACKGROUND OF THE INVENTION

1. Field of the Invention

The present invention relates generally to anti-theft devices for vehicles. More specifically, the invention is an anti-theft device for a skid steer loader to prevent unauthorized control and use of the skid steer loader.

2. Description of the Related Art

The related art of interest describes various steering wheel locking devices, but none discloses the present invention. There is a need for a locking device for the steering levers of a skid steer loader (skid loader) which also connects the locking device to both sides of the grid type safety cage of the skid loader. The relevant art will be discussed in the order of perceived relevance to the present invention.

U.S. Pat. No. 5,865,044 issued on Feb. 2, 1999, to Jin Fu Wu describes a steering wheel lock comprising a tubular member having a handle grip at one end to block rotation of the steering wheel, and a wheel rim hook and a keyed lock on the opposite end. A solid rod with another wheel rim hook telescopes into the lock portion with a ratchet toothed end to permit only axial extension when locked and only axial contraction only when unlocked. The wheel lock is distinguishable for its singular function of locking only the steering wheel.

The following patents describe steering wheel locks wherein the end rim hook with a lock slides along a single rod having a rim hook. U.S. Pat. No. 4,970,884 issued on Nov. 20, 1990, to Joseph E. Solow describes the carriage member having apertures to accept a ball in the lock under spring compression. U.S. Pat. No. 4,103,524 issued on Aug. 1, 1978, to Ronald A. Mitchell et al. describes a locking slide mechanism having a saddle and a depending loop to secure the steering wheel rim against a hook.

U.S. Pat. No. 5,582,045 issued on Dec. 10, 1996, to Sayeed Ahmed describes a steering wheel lock device having two pivoting parts wherein one part has a fork and a lock and the other part has a movable member which encircles the steering wheel rim. The device is distinguishable for its pivoting structure and limitation to a steering wheel.

A locking bar for a skid steer loader is described in my prior patent, U.S. Pat. No. 6,173,590, issued Jan. 16, 2001.

An Internet publication was seen describing a skid lock which locks the boom arms and the bucket in the full up position outside the cage, and does not include the locking fingers and the adapter element of the present invention. The publication was sent by E TIP, Inc., P.O. Box 571, Addison, Ill. 60101.

None of the above inventions and patents, taken either singularly or in combination, is seen to describe the instant invention as claimed. Thus, a skid steer lock solving the aforementioned problems is desired.

SUMMARY OF THE INVENTION

The present invention is a locking device for immobilizing the drive control levers inside a skid steer loader (skid loader), such as a Bobcat-type vehicle with a grid-type safety cage. The invention has an extendable shaft, a locking mechanism, two base plates, and two cage engaging means. Each cage engaging means is connected to a base plate which is connected to one end of the shaft. The shaft is made of two segments and can contract or extend by either telescoping one piece inside the other or by having one piece slide past the other in conjunction with a brace. When in use the skid steer lock is positioned inside the cabin of a skid loader such that the cage engaging means extend through both sides of the cage and the skid steer lock prevents the use of the skid loader's drive levers. The overall length of the invention is adjusted using the extendable shaft, and is locked in position with the locking mechanism so as to prevent unwanted removal of the device.

Accordingly, it is a principal object of the invention to provide a skid steer lock for a vehicle having a driver's safety cage and drive control lever's.

It is another object of the invention to provide a skid steer lock which attaches at each end to the driver's safety cage.

It is a further object of the invention to provide a skid steer lock which immobilizes the drive control levers.

Still another object of the invention is to provide a skid steer lock which prevents access to the skid loader driver's seat.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is an top view of the first embodiment of the skid steer lock according to the present invention.

FIG. 1B is a side view of the first embodiment of the skid steer lock according to the present invention.

FIG. 3A is an top view of the second embodiment of the skid steer lock according to the present invention.

FIG. 3B is a side view of the second embodiment of the skid steer lock according to the present invention.

FIG. 4A is an top view of the third embodiment of the skid steer lock according to the present invention.

FIG. 4B is a side view of the third embodiment of the skid steer lock according to the present invention.

FIG. 8A is an top view of the seventh embodiment of the skid steer lock according to the present invention.

FIG. 8B is a side view of the seventh embodiment of the skid steer lock according to the present invention.

DETAILED DESCRIPTION OF THE PREFERRED EMBODIMENTS

Figure 2:
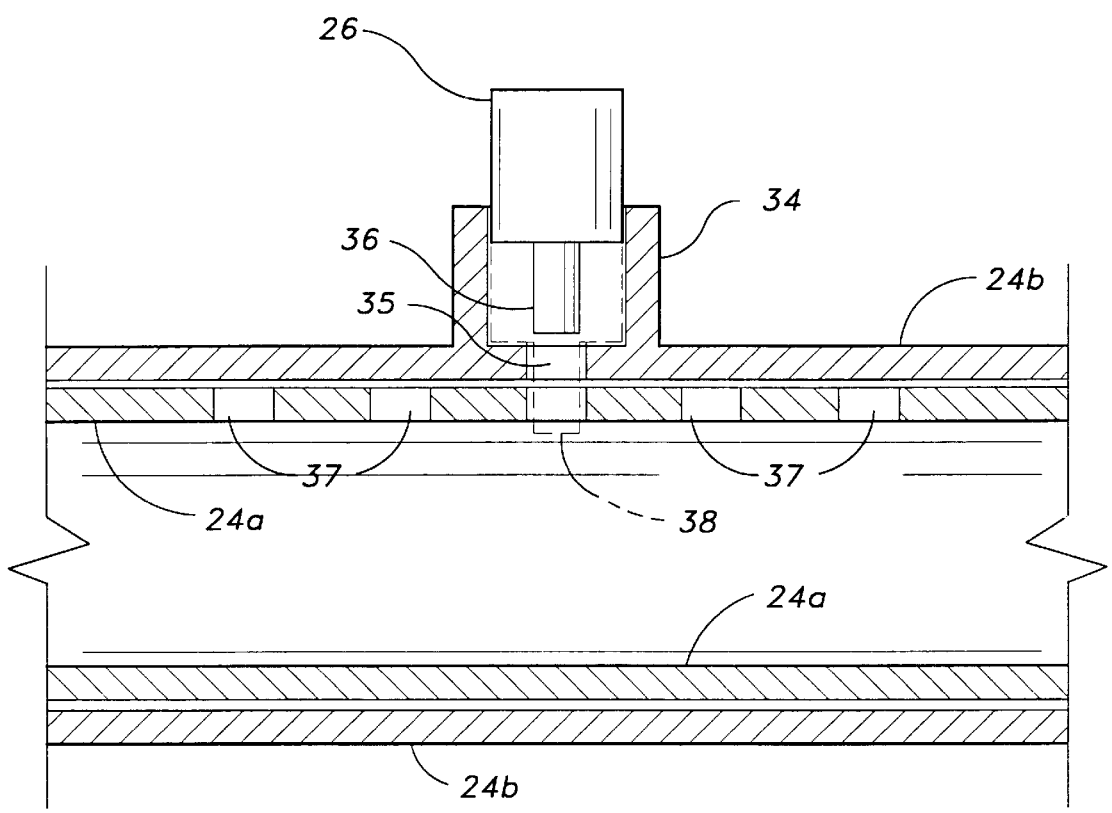
FIG. 2 is a longitudinal section view showing a spring loaded lock disposed in the shaft.

As seen in FIGS. 1A, 1B, the skid steer lock is made up of an extendable shaft 22, a locking mechanism 26, two end plates 28 and two cage engaging means 30. The shaft has two ends and is made of two separate shaft segments 24a, 24b. The shaft 22 extends by either telescoping one shaft segment 24a inside the other 24b as seen in the first embodiment shown in FIGS. 1A, 1B, or by parallel sliding of one segment past the other, as discussed below.

One end plate 28 is welded to each end of the shaft 22. The end plates 28 are flat and rectangular except for a rectangular tab 32 which extends from one edge of each plate 28. The tabs 32 are bent towards the shaft 22. Welded to the end plates is a cage engagement means 30. In the embodiment shown in FIGS. 1A, 1B the engagement means is a single cylinder shaped finger adapted to protrude through a skid loader safety cage.

The shaft 22 may be locked in an extended or contracted position with a spring loaded locking mechanism 26. This type of locking mechanism is well known in the art. FIG. 2 shows a sectional view of the shaft segments 24a, 24b, the locking mechanism 26 and the lock housing 34. The locking mechanism 26 has a lock pin 36 on one end. Surrounding and protecting the locking mechanism 26 is a rectangular housing 24. The locking mechanism 26 is shown in its unlocked position in solid lines. The locking mechanism 26 may be moved to a locked position, shown in phantom, in which the lock pin 36 is inserted through aligned holes 35 and 37 in the shaft segments 24b and 24a, e.g., by pressing in on the lock cylinder. Shaft segment 24a has a plurality of holes 37 defined therein in order to adjust the length of extendable shaft 22 as desired. Once locked, a key must be inserted to move the locking mechanism 26 to the unlocked position, thereby retracting the lock pin 36 from the aligned holes. The lock pin 36 may also engage with grooves 42 cut into one of the shaft segments 24b as discussed below.

When the skid steer lock 20 is used, it is positioned in the cab of a skid loader having a grid type safety cage. The skid steer lock 20 is positioned inside the cab such that the drive control levers of the skid loader are prevented from operating normally, i.e., prevented from moving forward or backward or both. The preferred placement of the lock is directly above the operator's seat with the cage engagement means 30 extending through the safety cage up to the end plates 28. The shaft 22 is extended so as to fully extend the cage engagement means 30 through the safety cage. Once properly extended, the shaft 22 is locked in the extended position with the lock mechanism 26 as described above, so as to prevent the removal of the lock from the safety cage.

When not in use the skid steer lock 20 may be stored using the storage tabs 32. The storage tabs are extended through the safety cage and the shaft 22 is contracted and locked into position, thereby securing the entire skid steer lock to the safety cage.

The present invention has several different embodiments. Identical reference numbers reflect identical parts. FIGS. 1A, 1B show the first embodiment of the skid steer lock. The cage engagement means 30 are single short fingers which extend though the safety cage up to the base plate.

FIGS. 3A, 3B show a second embodiment of the skid steer lock. The cage engagement means in this embodiment consist of two pairs of short fingers 36 which are designed to extend through a safety cage. The remainder of the device is the same as described in FIGS. 1A, 1B and 2.

FIGS. 4A, 4B show a third embodiment of the skid steer lock. The cage engagement means are identical to the means disclosed in the first embodiment. An arm 38 is welded to each shaft segment 24a, 24b. Each arm 38 is bent to form a right angle. When in use the arms 38 are designed hook onto the drive control levers to further secure the drive control levers of a skid loader. The remainder of the device is the same as shown in FIGS. 1A, 1B and 2.

Figure 5A:
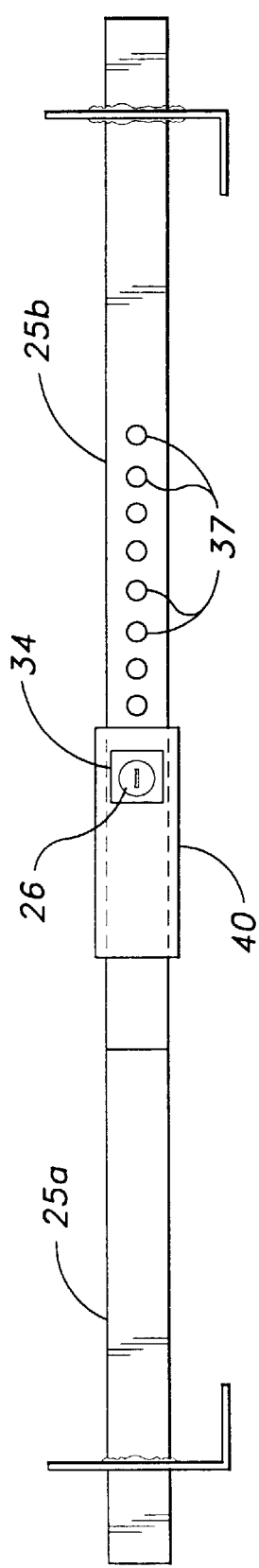
FIG. 5A is an top view of the fourth embodiment of the skid steer lock according to the present invention.
Figure 5B:
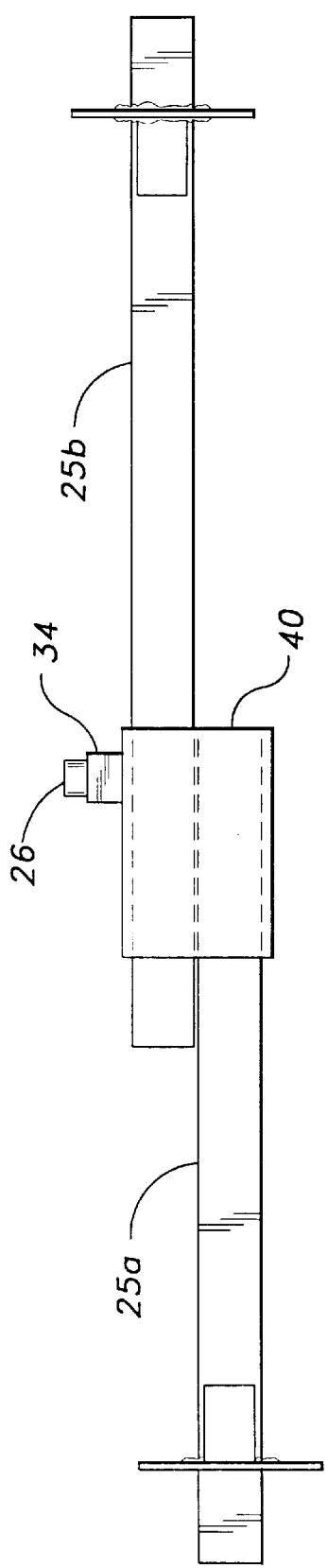
FIG. 5B is a side view of the fourth embodiment of the skid steer lock according to the present invention.

FIGS. 5A, 5B show a fourth embodiment of the invention. The shaft 22 in this embodiment expands and contracts by sliding shaft segments 25a and 25b past one another in a parallel orientation, as opposed to the telescoping shaft segments 24a, 24b used in the previous embodiments. The two shaft segments 25a, 25b are secured to one another through the use of a U-shaped brace 40. The U-shaped brace 40 is attached to one shaft segment 25a and the other shaft segment 25b slides parallel to the first shaft segment 25a inside of the U-shaped brace 40. Alternatively, a hollow connector slidable over both shaft segments 25a and 25b or other suitable coupler may be substituted for U-shaped brace 40. A spring loaded locking mechanism 26 as found in the first embodiment secures one shaft segment 25b to the U-shaped brace 40 by engaging with several holes 37 defined in one shaft segment 25b. The remainder of the device is the same as described in FIGS. 1A, 1B and 2.

Figure 6A:
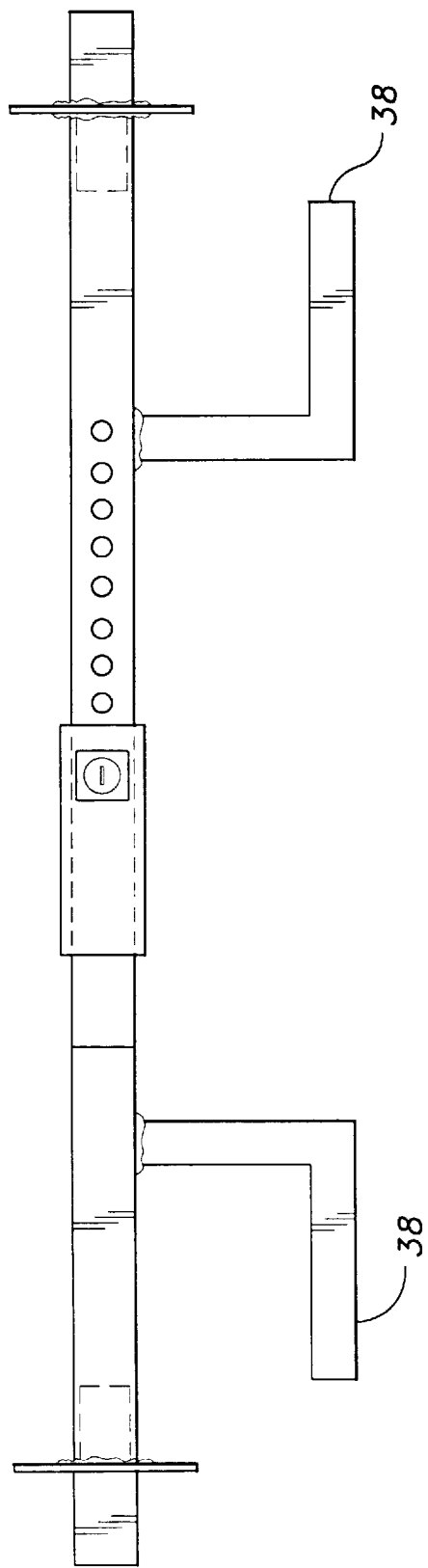
FIG. 6A is an top view of the fifth embodiment of the skid steer lock according to the present invention.
Figure 6B:
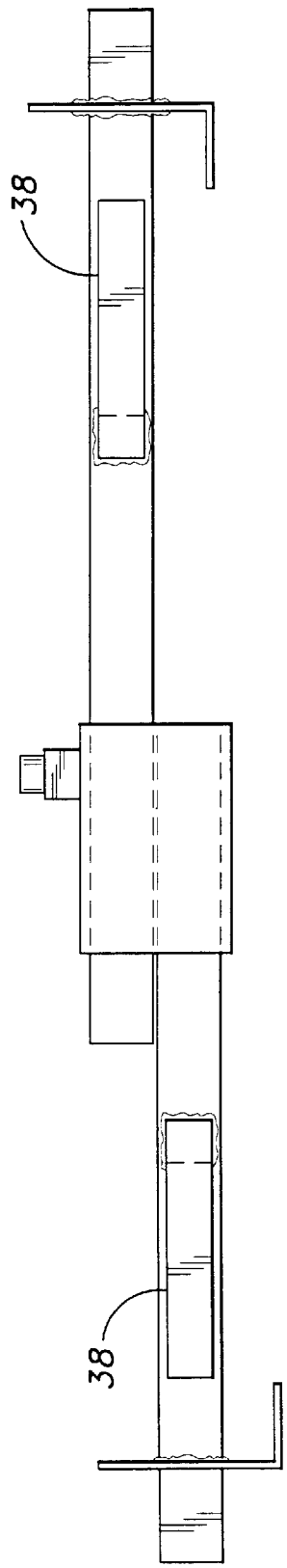
FIG. 6B is a side view of the fifth embodiment of the skid steer lock according to the present invention.

FIGS. 6A, 6B show the fifth embodiment of the skid steer lock. This embodiment is similar to the fourth embodiment except it has the arms 38 of the third embodiment. The arms 38 are welded to shaft segments 25a, 25b in an orientation designed to further restrict the movement of a skid loader's drive levers. The remainder of the device is the same as described in FIGS. 5A, 5B and 2.

Figure 7A:
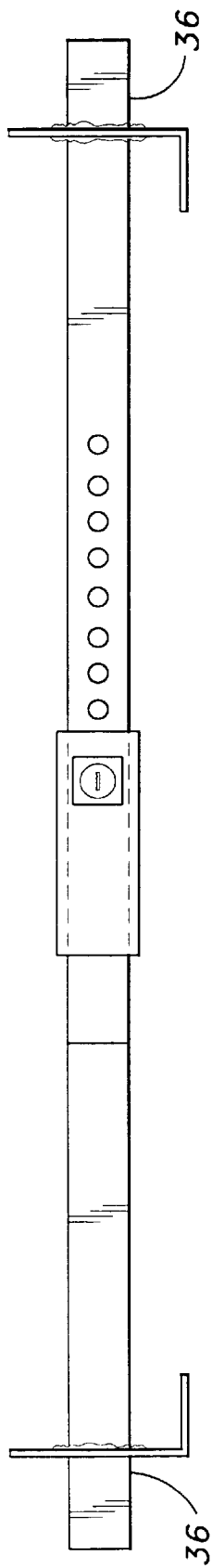
FIG. 7A is an top view of the sixth embodiment of the skid steer lock according to the present invention.
Figure 7B:
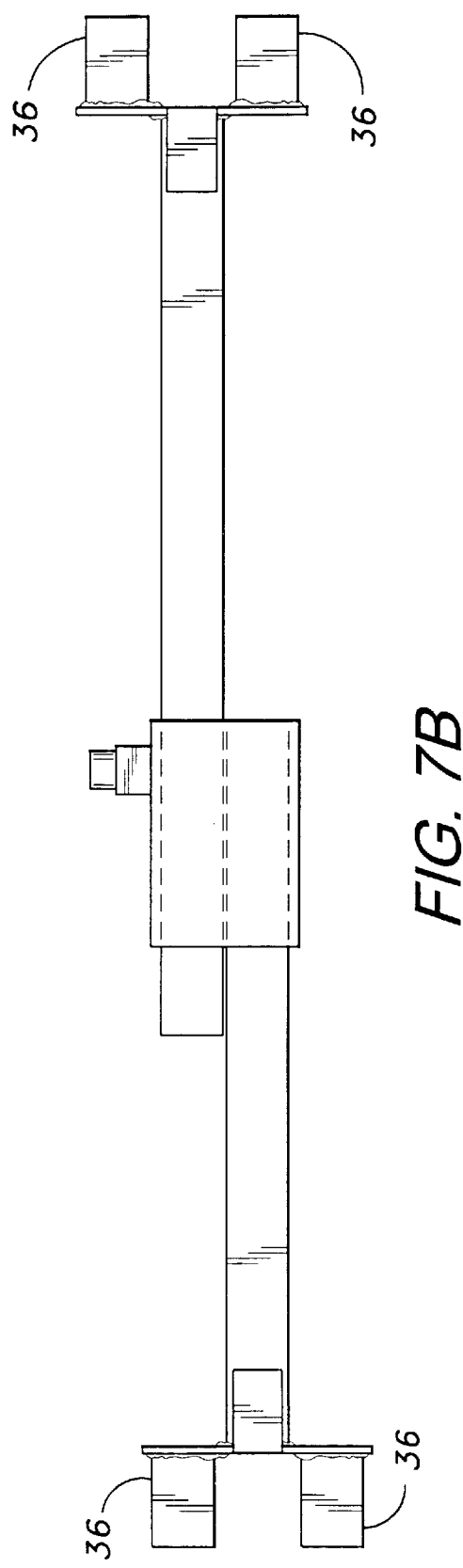
FIG. 7B is a side view of the sixth embodiment of the skid steer lock according to the present invention.

FIGS. 7A, 7B show the sixth embodiment of skid steer lock. This embodiment is similar to the fourth embodiment except the safety cage engaging means have the two short fingers present in the second embodiment. The remainder of the device is the same as described in FIGS. 5A, 5B and 2.

FIGS. 8A, 8B show the seventh embodiment of the skid steer lock. This embodiment has the parallel sliding shaft segments shown in the fourth embodiment except that the lock pin interacts with grooves 42 cut into one shaft segment 24b rather than holes. This embodiment has two pairs of elongated fingers 44 with circular flanges 46 welded to each finger 44. The flanges function to stop the fingers from extending into the safety cage any further than the flanges themselves. The remainder of the device is the same as described in FIGS. 5A, 5B and 2.

All of the above embodiments are preferably made of steel, but any material that is sufficiently durable may be used.

It is to be understood that the present invention is not limited to the embodiments described above, but encompasses any and all embodiments within the scope of the following claims.

I claim:

1. A skid steer lock comprising:
    an extendable shaft having a first shaft segment and a second shaft segment;
    a brace attached to said first shaft segment, said second shaft slides parallel to said first shaft while being disposed inside said brace;
    two end plates, one disposed upon each end of said extendable shaft;

cage engagement means including four short cylinders, two cylinders disposed on each said end plate, for engaging a skid steer loader cage disposed upon each said end plate; and locking means disposed midway between the two ends of said extendable shaft for temporarily locking said extendable shaft at a desired length.

2. A skid steer lock as in claim 1, wherein each said shaft segment is square in cross section.

3. A skid steer lock as in claim 1 further comprising:

two storage tabs, one tab disposed on each said end plate;

wherein said storage tabs are adapted to secure said skid steer lock to said safety cage.

4. A skid steer lock as in claim 1 further comprising:

two arms disposed on each said shaft segment;

wherein said arms are capable of further restricting the movement of a skid loader's drive control levers.

5. A skid steer lock comprising:

an extendable shaft having a first shaft segment and a second shaft segment;

a brace attached to said first shaft segment, said second shaft slides parallel to said first shaft while being disposed inside said brace;

two end plates, one disposed upon each end of said extendable shaft;

cage engagement means including four long cylinders, two cylinders disposed on each said end plate and four flanges, one flange disposed on each said cylinder, for engaging a skid steer loader cage disposed upon each said end plate; and locking means disposed midway between the two ends of said extendable shaft for temporarily locking said extendable shaft at a desired length.

6. A skid steer lock as in claim 5, wherein each said shaft segment is square in cross section.

7. A skid steer lock as in claim 5 further comprising:

two storage tabs, one tab disposed on each said end plate;

wherein said storage tabs are adapted to secure said skid steer lock to said safety cage.

8. A skid steer lock as in claim 5 further comprising:

two arms disposed on each said shaft segment;

wherein said arms are capable of further restricting the movement of a skid loader's drive control levers.

9. A skid steer lock comprising:

an extendable shaft having a first shaft segment and a second shaft segment;

a brace attached to said first shaft segment, said second shaft slides parallel to said first shaft while being disposed inside said brace;

two end plates, one disposed upon each end of said extendable shaft;

cage engagement means for engaging a skid steer loader cage disposed upon each said end plate;

locking means disposed midway between the two ends of said extendable shaft for temporarily locking said extendable shaft at a desired length; and two storage tabs, one tab disposed on each said end plate;

wherein said storage tabs are adapted to secure said skid steer lock to said safety cage.

10. A skid steer lock as in claim 9, wherein each said shaft segment is square in cross section.

11. A skid steer lock as in claim 9, wherein said cage engagement means comprises:

two short solid cylinders, one cylinder disposed on each said end plate.

12. A skid steer lock as in claim 9, wherein said cage engagement means comprises:

four short cylinders, two cylinders disposed on each said end plate.

13. A skid steer lock as in claim 9, wherein said cage engagement means comprises:

four long cylinders, two cylinders disposed on each said end plate; and four flanges, one flange disposed on each said cylinder.

14. A skid steer lock as in claim 9 further comprising:

two arms disposed on each said shaft segment;

wherein said arms are capable of further restricting the movement of a skid loader's drive control levers.

* * * * *